US008493569B2

(12) United States Patent
Kapner

(10) Patent No.: US 8,493,569 B2
(45) Date of Patent: Jul. 23, 2013

(54) OPTICAL ENCODER READHEAD CONFIGURATION WITH PHOSPHOR LAYER

(75) Inventor: Daniel John Kapner, Seattle, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 176 days.

(21) Appl. No.: 12/979,256

(22) Filed: Dec. 27, 2010

(65) Prior Publication Data

US 2012/0162663 A1    Jun. 28, 2012

(51) Int. Cl.
*G01B 11/02* (2006.01)
(52) U.S. Cl.
USPC .......................................................... 356/499
(58) Field of Classification Search
USPC .................. 356/499, 521, 494, 485–488, 490
See application file for complete search history.

(56) References Cited

U.S. PATENT DOCUMENTS

| | | | | |
|---|---|---|---|---|
| 4,272,679 | A * | 6/1981 | Blades | 250/372 |
| 5,712,483 | A | 1/1998 | Boone | |
| 5,909,283 | A | 6/1999 | Eselun | |
| 6,066,861 | A | 5/2000 | Höhn | |
| 6,417,019 | B1 | 7/2002 | Mueller | |
| 6,906,315 | B2 * | 6/2005 | Tobiason | 250/237 R |
| 7,083,490 | B2 | 8/2006 | Mueller | |
| 7,126,696 | B2 * | 10/2006 | Tobiason | 356/499 |
| 7,214,947 | B2 | 5/2007 | Bueno | |
| 7,235,792 | B2 | 6/2007 | Elofson | |
| 7,502,122 | B2 * | 3/2009 | Tobiason et al. | 356/499 |
| 8,094,323 | B2 * | 1/2012 | Kapner | 356/616 |
| 2002/0074929 | A1 | 6/2002 | Taskar | |
| 2006/0192087 | A1 | 8/2006 | Kuszpet | |
| 2007/0131853 | A1 * | 6/2007 | Chua et al. | 250/231.13 |
| 2008/0173886 | A1 | 7/2008 | Cheon | |
| 2008/0176066 | A1 * | 7/2008 | Chang et al. | 428/336 |
| 2008/0253106 | A1 * | 10/2008 | Sempel et al. | 362/84 |
| 2012/0190590 | A1 * | 7/2012 | Wohlstadter et al. | 506/39 |

FOREIGN PATENT DOCUMENTS

| | | |
|---|---|---|
| EP | 1 521 060 A2 | 4/2005 |
| EP | 1 887 324 A1 | 2/2008 |
| WO | 2007/042962 A1 | 4/2007 |

OTHER PUBLICATIONS

European Search Report mailed Nov. 2, 2012, in European Application No. 11195745, filed Dec. 27, 2011, 6 pages.
Cowley, J.M., and A.F. Moodie, "Fourier Images: I—The Point Source," Proceedings of the Physical Society, Section B 70(5):486-496, May 1957.

* cited by examiner

*Primary Examiner* — Gregory J Toatley
*Assistant Examiner* — Maurice Smith
(74) *Attorney, Agent, or Firm* — Christensen O'Connor Johnson Kindness PLLC

(57) ABSTRACT

A device for measuring relative displacement between two members includes a scale grating and an optical encoder readhead comprising a first wavelength light source illuminating the grating. The grating outputs scale light to form a moving periodic intensity pattern at the first wavelength. The readhead comprises a plurality of spatial phase detectors comprising: a periodic spatial filter; a phosphor layer that receives light arising from the first wavelength periodic intensity pattern and outputs second wavelength light, and a photodetector element that receives, and is sensitive to, the second wavelength light. The photodetector element inputs second wavelength light corresponding to a spatially filtered version of the first wavelength periodic intensity pattern and outputs a signal indicative of its spatial phase relative to that spatial phase detector. The spatial filtering may be provided by a mask element, or by a pattern of the phosphor layer and/or the detector element, in various embodiments.

17 Claims, 4 Drawing Sheets

OPTICAL ENCODER READHEAD CONFIGURATION WITH PHOSPHOR LAYER

FIELD OF THE INVENTION

This invention relates generally to displacement sensing optical encoders, and more particularly to an improved configuration for a high resolution readhead used in an optical encoder.

BACKGROUND OF THE INVENTION

Various movement or position encoders for sensing linear, rotary or angular movement are currently available. These encoders are generally based on optical systems, magnetic scales, inductive transducers, or capacitive transducers.

Optical encoders may utilize a self-imaging arrangement in order to detect a displacement of a scale member comprising a scale grating. The basic principle of self-images, also known as Talbot images, is described in the paper by Cowley, J. M., and A. F. Moodie, 1957, *Proc. Phys. Soc.* B, 70, 486, which is incorporated herein by reference. An exemplary optical encoder utilizing self-imaging is disclosed in U.S. Pat. No. 6,906,315 (the '315 patent), which is incorporated herein by reference in its entirety.

Optical encoders may utilize an interferometric arrangement in order to detect a displacement of a scale member comprising a scale grating. For optical encoders utilizing an interferometric arrangement, a number of systems have been developed. One recent system utilizing fewer parts than most previous systems is disclosed in U.S. Pat. No. 5,909,283, to Eselun, which is incorporated herein by reference in its entirety. The system described in the '283 patent has a grating scale and readhead including a point source (laser diode in readhead), a Ronchi grating or holographic element which acts as a spatial filter, and a photodetector array. As described, the point source results in interference fringes having a fringe pitch equal to that of the scale. The interference fringe light is transmitted through the Ronchi grating or holographic element to the photodetector array. The photodetector array is arranged to derive four channels of quadrature signals from the transmitted fringe light. In another example, U.S. Pat. No. 7,126,696 (the '696 patent), which is incorporated herein by reference in its entirety, discloses an optical encoder using an interferometric arrangement.

However, despite the foregoing, there is an ongoing need for higher resolution optical encoders which are economical, robust, and easy to install. One method of providing higher resolution is to use a scale member comprising a scale grating which provides a very fine scale grating pitch. However, prior art encoders which use this approach have various undesirable limitations. Optical encoders which improved resolution and/or fewer design and assembly constraints would be desirable.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Various optical encoders use a readhead to detect a periodic optical intensity pattern which moves with a scale. There are different techniques to generate the periodic optical intensity pattern from the scale. In many techniques, the pitch or spatial period of the optical intensity pattern depends on the pitch or spatial period of the scale grating pattern on the scale. As indicated above, one method of providing a high resolution optical encoder is to use a scale member having a relatively fine scale grating pitch (e.g., on the order of a few microns, or less, in some encoders). However, prior art encoders which use this approach have various undesirable limitations.

For example, when self-imaging techniques are used to generate the periodic optical intensity pattern that is detected in the optical encoder readhead, an operating gap between the scale grating and the readhead depends on the wavelength of light used for self-imaging. However, photodetector response may be poor at wavelengths which provide a desirable operating gap, resulting in a poor signal-to-noise ratio. In turn, a poor signal-to-noise ratio limits the degree of displacement or position signal interpolation which can be achieved. For example, well known quadrature signal detection methods used in optical encoders interpolate sinusoidal position signals to provide position resolution much smaller than the scale grating pitch (e.g., 10, 40, 100, 500, or 1000 times smaller, in some cases). A poor signal-to-noise ratio effectively limits the degree of signal interpolation and the resulting resolution. Thus, practical combinations of operating gaps, light source wavelengths, and photodetector response have undesirably restricted the design alternatives and/or the resolution achieved in self-imaging encoders. In addition, the tolerance for variations in the gap has been smaller than desired, thereby decreasing the practically achievable reliability and repeatability of measurements of such encoders.

When interferometric techniques are used to generate interference fringes that provide the periodic optical intensity pattern, the location of desirable interference fringe fields (and the associated range of operating gaps) and/or the fringe period depend on the diffraction angle of various diffraction orders of the source wavelength at the scale grating. Due to considerations analogous to those outlined above for self-imaging encoders, the practical combinations of operating gaps, light source wavelengths, and photodetector response have likewise undesirably restricted the design alternatives and/or resolution achieved in interferometric encoders.

The embodiments disclosed herein are directed to providing an encoder that overcomes the foregoing and other disadvantages. In various embodiments disclosed herein, an optical encoder utilizes a light source having a relatively short first wavelength (e.g., 300-450 nm) to illuminate a scale grating in order to provide a relatively large operating gap (and a relatively large gap tolerance) between the scale grating and a readhead. The encoder readhead may use a relatively economical photodetector which has a wavelength response peak at a wavelength (e.g., 750 nm) which is significantly larger than the first wavelength provided by the light source (e.g., the photodetector may be relatively unresponsive at the first wavelength). In order to provide a high signal-to-noise ratio, spatial phase detectors used in the readhead include a periodic spatial filter combined with a phosphor layer that receives the first wavelength and then outputs a second wavelength that is close to the wavelength response peak of the photodetector.

In particular, in various embodiments, a device for measuring the relative displacement between two members includes a scale comprising a scale grating formed along a measuring axis direction and an optical encoder readhead. The readhead comprises a light source configured to output source light with a first wavelength to the scale grating, which outputs scale light to form a periodic intensity pattern at the first wavelength which moves with the scale. The first wavelength is at least 300 nm and at most 450 nm. The readhead also comprises a detector assembly operable to detect the position of the periodic intensity pattern at the first wavelength relative to the detector assembly. The detector assembly comprises a plurality of spatial phase detectors comprising a periodic spatial filter, a phosphor layer positioned to receive light arising from the periodic intensity pattern at the first wavelength and output second wavelength light including a second wavelength that is larger than the first wavelength, and a photodetector element positioned to input the second wavelength light and output a signal indicative of the spatial phase of the periodic intensity pattern at the first wavelength relative to that spatial phase detector.

In various embodiments, the photodetector element of a spatial phase detector inputs second wavelength light corresponding to a spatially filtered version of the first wavelength periodic intensity pattern and outputs a signal indicative of the spatial phase of the first wavelength periodic intensity pattern relative to that spatial phase detector. The spatial filter that provides the spatially filtered version of the first wavelength periodic intensity pattern may be provided by a separate spatial filter mask element, or by a pattern of the phosphor layer, and/or by a pattern of the photodetector element, in various embodiments.

In some embodiments, the photodetector element may comprise a pattern of individual portions which provide the periodic spatial filter. In some embodiments, the phosphor layer may be a continuous layer located proximate to the pattern of individual portions of the photodetector element.

In some embodiments, the phosphor layer may comprise a pattern of individual portions which provide the periodic spatial filter. In some embodiments, the photodetector element may be a continuous element located proximate to the pattern of individual portions of the phosphor layer.

In some embodiments, the periodic spatial filter may comprise a mask element including a pattern of individual openings located between the periodic intensity pattern at the first wavelength and the phosphor layer.

In some embodiments, the periodic intensity pattern at the first wavelength may comprise one of (a) a self image of the scale grating, and (b) interference fringes arising from interfering diffraction orders of scale light diffracted by the scale grating. In some embodiments, the scale grating may have a scale pitch Pg which is less than 20 microns, or in some embodiments, less than 10 microns. In some embodiments, the second wavelength may include wavelengths that coincide with a wavelength response peak of the photodetector element.

In some embodiments, the second wavelength may be between 500 and 800 nm.

In some embodiments, the phosphor layer may comprise phosphor particles that are semiconductor nanocrystals.

In some embodiments, the phosphor layer may comprise phosphor particles that have a density corresponding to at least 80% by volume of the phosphor layer.

In some embodiments, the phosphor layer may be configured with a thickness such that all light that reaches the photodetector is second wavelength light.

In some embodiments, the phosphor layer may comprise phosphor particles which have a size distribution such that the average particle dimension is at most 25% of the period of the periodic intensity pattern at the first wavelength.

In some embodiments, the photodetector may comprise a CMOS photodetector array.

It should be appreciated that the phosphor layer is generally intended to convert energy in the periodic intensity pattern at the first wavelength light to energy at a second wavelength, or in a second wavelength range, that is more efficiently converted to electrical signals in the photodetector element than the first wavelength. Generally, the second wavelength, or the majority of the second wavelength range, output by the phosphor is at a longer wavelength than the first wavelength, since the peak wavelength response of the photodetector is generally at a wavelength that is greater than the first wavelength. Within the scope of this invention, a single phosphor type may output a relatively narrow wavelength band of second wavelength light, or a blend of phosphor types may output a relatively broader wavelength range of second wavelength light (e.g., a wavelength range which, as a whole, is more efficiently converted to electrical signals in the photodetector element than the first wavelength).

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
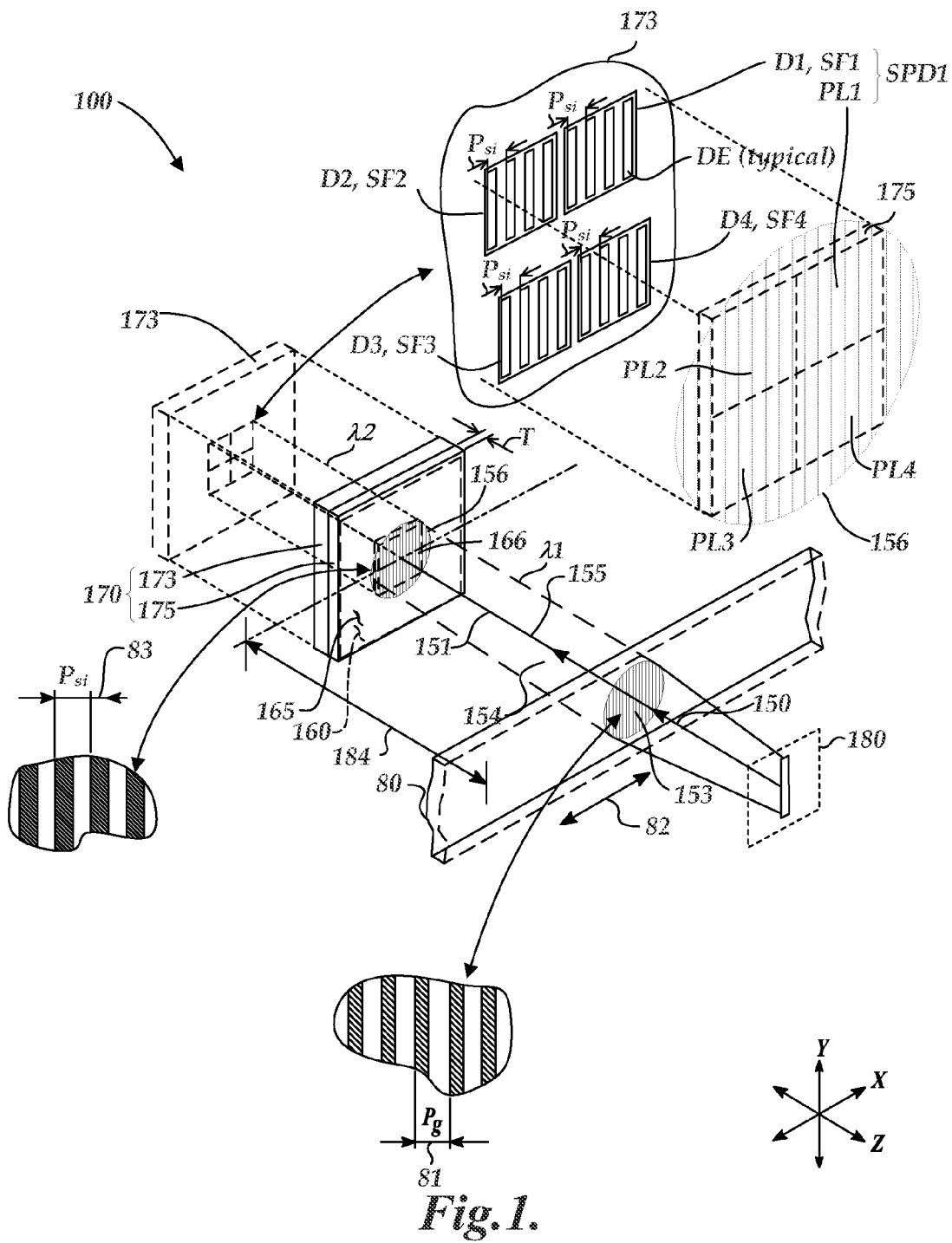
FIG. 1 shows a detector assembly including a first exemplary embodiment of spatial phase detectors according to this invention used in self-imaging arrangement in an optical encoder.

FIG. 1 shows a detector assembly 170 including a first exemplary embodiment of spatial phase detectors SPD1-SPD4 according to this invention, used in self-imaging arrangement 100 in an optical encoder. The self-imaging arrangement 100 includes a scale grating 80 and optical encoder readhead elements comprising a detector assembly 170, a light source 180, which are mounted in a fixed relationship relative to each other in a readhead housing (not shown), in practice. The scale grating 80 and the detector assembly 170 are separated by an operating gap 184. The detector assembly 170 may be located at a self-image plane 165 (described in greater detail below), such that the operating gap dimension 184 is the same as a self-image gap, which is designated $z_g$ in various formulas herein. The scale grating 80 is aligned along a measuring axis 82 and includes grating elements or bars extending perpendicular to the measuring axis 82, as indicated by vertical lines in an illumination spot 153. The grating elements or bars are arranged periodically along the measuring axis 82 according to a grating period 81, generally indicated herein as the grating period or grating pitch $P_g$. The light source 180, in various exemplary embodiments, may comprise a UV laser or a UV LED configured to provide a line source, or an array of line sources (e.g., using an aperture mask element), or other known light source configurations suitable for self-imaging. The detector assembly 170 comprises a photodetector 173 and a phosphor layer 175, described in greater detail below.

The orthogonal X, Y, and Z axes shown in FIG. 1 may be defined with reference to the plane of the scale grating 80. The X axis is parallel to the plane of the scale grating 80 and to the measuring axis 82. The X-Y plane is parallel to the plane of the scale grating 80, and the Z axis is perpendicular to that plane.

In operation, the light source 180 emits a source light 150 generally along a source light axis 151. The source light 150 is generally monochromatic or quasi-monochromatic and has a nominal first wavelength $\lambda_1$. The source light 150 illuminates the scale grating 80 at the illumination spot 153 which outputs scale light 154 generally along a scale light axis 155. In the embodiment shown in FIG. 1, the source light axis 151 and the scale light axis 155 are parallel to the Z axis and coincide. However, in other embodiments, known types of reflective self-imaging arrangements may be used, wherein the source light axis and a scale light axis are not parallel. In any case, the scale light 154 travels over the operating gap 184 to a self-image plane 165. At the self-image plane 165, the scale light 154 provides a periodic intensity pattern 156 including a self-image 166 at a receiver plane 160 coinciding with the detector assembly 170 in FIG. 1. The periodic intensity pattern 156 moves with the scale grating 80. The self-image 166 is an image consisting of light and dark stripes, each extending perpendicular to the measuring axis 82. The light and dark stripes are periodic in the direction parallel to the measuring axis 82 according to a self-image period 83, generally indicated herein as the self-image period or self-image pitch $P_{si}$. The detector assembly 170 detects the periodic intensity pattern 156 at the self image plane 165 in order to provide a measurement of a displacement of the scale 81 along the measuring axis 82, as described in greater detail below.

In the self-imaging arrangement 100, the self-image plane 165 is parallel to the plane of the scale grating 80. It should be appreciated that self-images are localized in space at a particular set of self-image planes. When the light source 180 outputs nominally collimated source light 150, and the arrangement is approximately as shown in FIG. 1, a condition for a usable self-image plane is:

$$z_g = \frac{P_g^2}{\lambda_1} \quad \text{(Eq. 1)}$$

For the configuration shown in FIG. 1, this provides a 1× level of magnification such that:

$$P_{si} = P_g \quad \text{(Eq. 2)}$$

In many applications, it is desirable to use as large a gap distance $z_g$, as possible (e.g., in order to allow for greater clearance and tolerances during mounting, alignment and operation). In many applications, it is desirable to use a fine grating pitch $P_g$ (e.g., in order to provide high resolution measurement). In accordance with the conditions of Eq. 1, in order to provide a larger or equivalent gap distance $z_g$ for a given grating pitch $P_g$, it is desirable to reduce the first wavelength $\lambda_1$. Conventionally, self imaging encoders have used a first wavelength $\lambda_1$ which is on the order of 780 nm. When such a wavelength is used with a 20 μm grating pitch $P_g$, the operating gap may be set at a self-imaging distance $z_g$ of approximately 513 microns. To reduce the grating pitch while maintaining a similar gap distance, or provide a larger operating gap using the same grating pitch, it is necessary that the light source 180 emits source light 150 with a smaller wavelength $\lambda_1$. For example, in the embodiment shown in FIG. 1, when the light source 180 is a UV laser diode or UV LED or the like, the source light 150 may have a first wavelength $\lambda_1$ of approximately 400 nm. For a similar gap distance $z_g$ of 500 microns, this allows for a grating pitch $P_g$ which is approximately 14 microns. If a detector assembly is used which includes spatial phase detectors such as those disclosed herein, such a configuration may improve the achievable measurement resolution by approximately 30%. Alternatively, if the grating pitch $P_g$ is maintained at 20 microns, then for a first wavelength $\lambda_1$ of approximately 400 nm, the operating gap may be increased to the self-imaging distance $z_g$ of approximately 1 mm, i.e., an increase of approximately a factor of two for the operating gap. However, unless a detector assembly is used which includes spatial phase detectors such as those disclosed herein, a first wavelength $\lambda_1$ of approximately 400 nm would produce a low signal in conventionally used photo detectors (e.g., CMOS photodetectors), which typically have a peak wavelength response near 700 nm, and a response at 400 nm which may be on the order of half of their peak wavelength response. Thus, prior art encoders have avoided such wavelengths, or have been adversely affected by the resulting poor signal.

The detector assembly 170 shown in FIG. 1 includes a first exemplary embodiment of spatial phase detectors SPD1-SPD4 according to this invention. It will be understood that the spatial phase detectors SPD1-SPD4 are similar to each other, except for their spatial phase relative to the periodic intensity pattern 156. Therefore, only spatial phase detector SPD1 will be described in detail. As best shown in the exploded view in FIG. 1, the spatial phase detector SPD1 comprises a phosphor layer PL1 which is a portion of the phosphor layer 175, a photodetector element D1 which is a portion of photodetector 173, and a periodic spatial filter SF1 which is provided by the periodic arrangement of the individual detector elements DE in the photodetector element D1. That is, in this embodiment, the periodic spatial filter SF1 is not a separate element from the photodetector element D1. The individual detector elements DE may be arranged in a detector array and interconnected to sum their signals. In some embodiments the individual detector elements DE are spaced along the measuring axis 82 at a pitch or spatial wavelength equal to the self-image pitch $P_{si}$, and have a width that is less than (e.g., half of) Psi, such that they spatially filter a moving periodic intensity pattern having a pitch $P_{si}$. In the embodiment shown in FIG. 1, the phosphor layer PL1 (e.g., that portion of the phosphor layer 175) is positioned to receive light arising from the periodic intensity pattern 156 the first wavelength and output second wavelength light that forms a corresponding intensity pattern at including light at a second wavelength that is larger than the first wavelength (e.g., at a second wavelength approximately corresponding to a wavelength response peak of photodetector element D1). Despite the fact that the phosphor layer PL1 emits diffuse light in response to excitation by the periodic intensity pattern 156, if the thickness T of the phosphor layer PL1 is sufficiently small relative to the pitch $P_{si}$ and is located in proximity to the photodetector element D1 (e.g., the phosphor layer PL1 is located as a layer abutting, or applied to, the photodetector element D1), then the second wavelength light will form a second wavelength intensity pattern at the photodetector element D1 which moves corresponding to the first wavelength periodic intensity pattern 156. The photodetector element D1 will then be able to spatially filter the second wavelength intensity pattern, and provide a signal indicative of the spatial phase of the periodic intensity pattern 156 relative to the spatial phase detector SPD1. Furthermore, because the second wavelength approximately matches the peak wavelength response to the photodetector element D1, the resulting signals may exhibit a high signal-to-noise ratio, which allows a high level of position signal interpolation according to known techniques. A high level of position signal interpolation may provide high resolution position measurements, as previously indicated. Thus, the detector assembly 170 disclosed above includes spatial phase detectors such that using a first wavelength $\lambda_1$ of very roughly 400 nm, which would produce a low signal in the photodetectors of a conventional spatial phase detector (e.g., CMOS photodetectors), does not have an adverse effect on performance, due to the principles outlined above.

It will be appreciated that the spatial phase detectors SPD2, SPD3 and SPD4 may be identical to the spatial phase detector SPD1, except that they may be arranged at spatial phase positions of 90, 180, and 270 degrees of spatial phase shift, respectively, with respect to the position of the spatial phase detector SPD1 and the periodic intensity pattern 156. Such an arrangement provides respective signals from the respective spatial phase detectors which may be processed to provide position signals based on high resolution interpolated quadrature signals, according to known quadrature signal processing methods. Quadrature signal processing is not described in detail herein, but is described in further detail in the incorporated '315 patent and '696 patent, for example.

As outlined above, conventional and economical photodetectors which are suitable for use in a self imaging encoder generally have a peak wavelength response at approximately 700 nm. Such photodetectors may not be very sensitive to wavelengths on the order of 400 nm and therefore, are not suitable for detecting the periodic intensity pattern 156 when the source light 150 has wavelength $\lambda_1$ which is on the order of 400 nm (e.g., at least 375 nm and at most 450 nm, in various embodiments). However, such a wavelength provides advantages as outlined above. Therefore, the embodiment shown in FIG. 1 provides a means for detecting the periodic intensity pattern 156 when the source light 150 has wavelength $\lambda_1$ which is on the order of 400 nm. In particular, the phosphor layer 175 receives the periodic intensity pattern 156 at the first wavelength $\lambda_1$ and outputs second wavelength light to the photodetector 173 at a second wavelength $\lambda_2$, which approximately corresponds to a wavelength sensitivity peak of the photodetector 173.

The phosphor layer 175 comprises phosphor particles (e.g., conventional, phosphors, or light-emitting nanoparticles, or the like), and a type of phosphor particles is preferably chosen such that when it is excited by light of the first wavelength $\lambda_1$, it outputs light at a second wavelength $\lambda_2$ which approximately corresponds to a peak sensitivity of the photodetector 173. Thus, the embodiment outlined above allows for an optical encoder with a relatively large operating gap corresponding to a relatively large self-imaging distance $z_g$ (even when the grating pitch $P_g$ is relatively fine), and a high signal-to-noise ratio that allows accurate signal interpolation. In addition, the gap tolerance may be improved at the large operating gap. It should be appreciated that the particular embodiment of the detector assembly 170 outlined above is exemplary only and not limiting. For example, the detector assembly 170 may comprise elements and features as described below with reference to FIGS. 3 and 4, in various embodiments.

Figure 2:
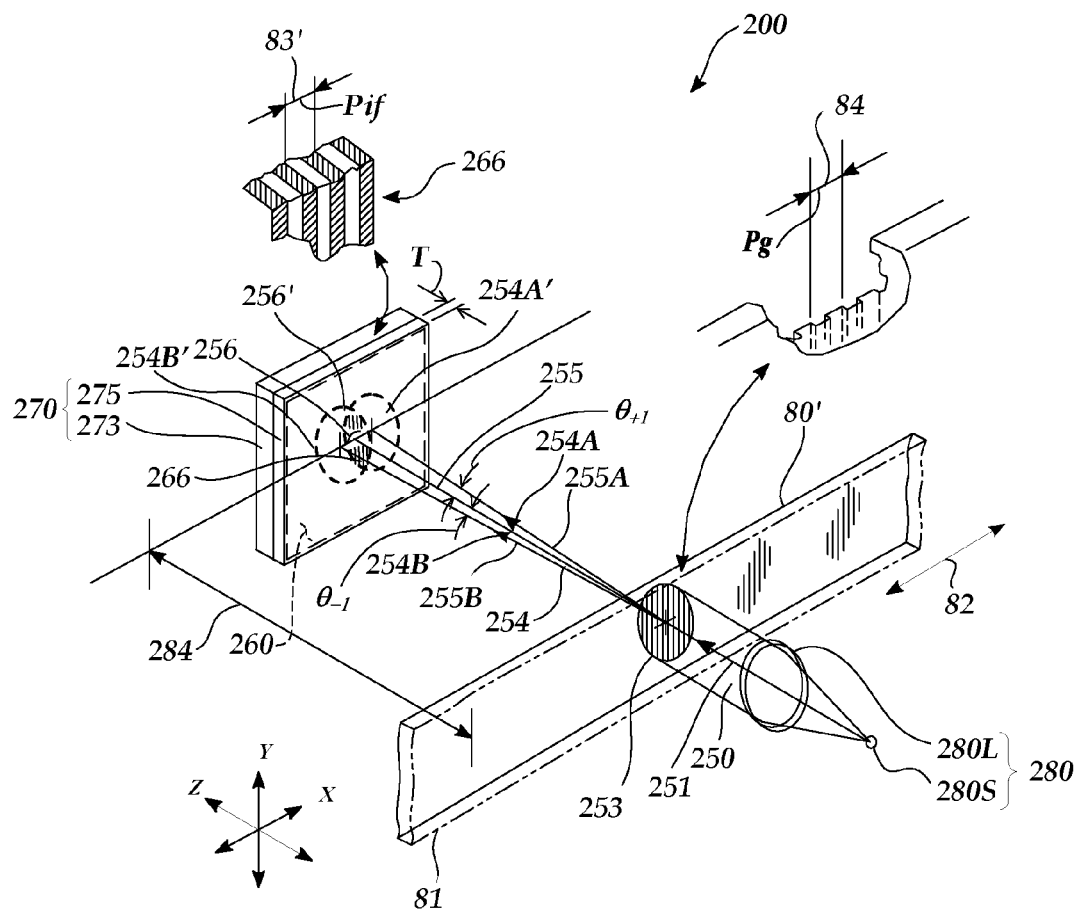
FIG. 2 shows a detector assembly including spatial phase detectors according to this invention used in an interferometric arrangement in an optical encoder.

FIG. 2 shows a detector assembly 270 including spatial phase detectors according to this invention used in an interferometric arrangement 200 in an optical encoder. The basic operating principles of interferometric encoders are known and only aspects of the operation relevant to the present invention are described in detail here. Some elements shown in FIG. 2 have reference numbers that are identical to, or have identical suffixes to, the reference numbers of elements shown in FIG. 1 (e.g., the suffix XX in the numbers 1XX and 2XX are the same). Such elements may be understood by analogy to previous discussion, unless otherwise indicated by description or context, and only significant differences in the features or operation of the interferometric arrangement 200 relative to the self-imaging arrangement 100 are described below.

The interferometric arrangement 200 includes a scale grating 80' and optical encoder readhead elements comprising a detector assembly 270 and a light source 280 which are mounted in a fixed relationship relative to each other in a readhead housing (not shown), in practice. The scale grating 80' and the detector assembly 270 are separated by an operating gap 284. Considerations relating to the operating gap 284 are described further below.

The light source 280 may comprise a coherent source 280S and a collimating lens 280L. The coherent source 280S, in various exemplary embodiments, may comprise a UV laser or other known light source suitable for producing interference fringes. The detector assembly 270 comprises a photodetector 273 and a phosphor layer 275, and may be similar or identical to the previously described detector assembly 170, or may comprise elements and features as described below with reference to FIGS. 3 and 4, in various embodiments.

The scale grating 80' in the embodiment shown in FIG. 2 is a phase grating configured to suppress zero order light in light transmitted or reflected from the scale grating. The grating elements are arranged periodically along the measuring axis 82 according to a grating period 84, generally indicated herein as the grating period or grating pitch $P_g$.

In operation, the source 280S emits source light to the lens 280L such that the light source 280 emits a source light 250 generally along a source light axis 251. As shown in FIG. 2, the source light 250 is nominally collimated. However, it should be appreciated that in various alternative arrangements, the source light 250 may have a divergence angle. The source light is generally monochromatic or quasi-monochromatic and has a nominal first wavelength $\lambda_1$. The source light 250 illuminates the scale grating 80' at the illumination spot 253, and the scale grating 80' outputs scale light 254 generally along a scale light axis 255. In the embodiment shown in FIG. 2, the source light axis 251 and the scale light axis 255 are parallel to the Z axis and coincide. However, in other embodiments, known types of reflective interferometric arrangements may be used, wherein the source light axis and a scale light axis are not parallel. In any case, the scale light 254 travels over the operating gap 284 and forms a periodic intensity pattern 256 including interference fringes at a receiver plane 260 coinciding with the detector assembly 270 in FIG. 2. The periodic intensity pattern 256 moves with the scale grating 80'.

The surface relief structure of the scale grating 80' suppresses the zero order component of the scale light 254, and the duty cycle of the scale grating 80' suppresses the even-order diffraction orders. The +3 and −3 diffraction orders and higher odd-order diffraction orders generally create extraneous interference fringe features and detract from the ability to accurately interpolate measurement signals arising from the periodic intensity pattern 256. Therefore, in various exemplary embodiments the detector assembly 270 is arranged at an operating gap selected such that the included spatial phase detectors avoid light arising from the +3 and −3 diffraction orders. Thus, only the light of the +1 and −1 diffraction orders are illustrated in FIG. 2, since only the light and interference fringes arising from these diffraction orders is detected in various embodiments. The light of the zero order, even order, and 3$^{rd}$ and higher odd diffraction orders are not illustrated in FIG. 2.

The +1 and −1 diffraction orders are diffracted and output as the scale light 254A and 254B generally along the scale light axes 255A and 255B as shown in FIG. 2. It should be appreciated that the scale light axes 255A and 255B correspond to the diffraction of the central ray of the source light 250. Thus, the central scale light axes 255A and 255B follow first order diffraction angles $\theta_{-1}$ and $\theta_{+1}$ when the source light 250 is incident approximately normal to the plane of the scale grating 80, as shown in FIG. 2. Each of the +1 and −1 diffraction order scale lights 254A and 254B, respectively, follow the scale light axes 255A and 255B to provide illumination zones 254A' and 254B' as indicated by the dashed circles showing the approximate cross-section of the illumination zones 254A' and 254B' at a receiver plane 260 coinciding with the detector assembly 270 in FIG. 2. The illumination zones 254A' and 254B' of the scale light 254A and 254B intersect to provide an interference zone 256' including interference fringes 266. The interference zone 256' thus includes the periodic intensity pattern 256 that is detected by the detector assembly 270, and the spatial phase detectors of the detector assembly 270 (e.g., such as the spatial phase detectors SPD1-SPD4) are configured to be located within the interference zone 256'.

The interference fringes 266 in the interference zone 256' consist of light and dark interference fringe zones, each extending perpendicular to the measuring axis 82 along both the Z and Y directions. The light and interference fringe zones are periodic along the direction parallel to the measuring axis 82 according to an interference fringe period 83', generally indicated herein as the interference fringe period or interference fringe pitch $P_{if}$. Thus, because the interference fringe zones extend along the direction perpendicular to the plane of the scale grating 80, an operable periodic intensity pattern 256 exists for a range of potential gaps 284 throughout the interference zone 256'. Accordingly, in contrast to the previously described self-imaging arrangement, the gap 284 and the corresponding location of the receiver plane 260 can generally vary within a reasonable tolerance range without significantly affecting the operation or accuracy of position measurements along the measuring axis 82. However, it is still advantageous for the nominal operating gap 284 to satisfy certain constraints, in various embodiments. In particular, the operating gap 284 must be such that the receiver plane 260 of the spatial phase detectors of the detector assembly 270 (e.g., such as the spatial phase detectors SPD1-SPD4) is located where the interference zone 256' of the +/−first diffraction orders has a sufficient size to encompass the spatial phase detectors, and such that spatial phase detectors do not receive light from the +/−third diffraction orders.

When the source light 250 is nominally collimated, the scale light axes 255A and 255B follow paths which are oriented at respective first order diffraction angles $\theta_{-1}$ and $\theta_{+1}$ in the X-Z plane with respect to the source light axis 251 (parallel with the Z axis), according to the diffraction angle relation:

$$\sin\theta_{\pm 1} = \frac{\pm \lambda_1}{P_g} \quad \text{(Eq. 3)}$$

According to EQUATION 3, for a given grating pitch $P_g$, a larger wavelength results in a larger first order diffraction angle $\theta$. As implied in FIG. 2, a larger first order diffraction angle $\theta$ will cause the scale lights 254A and 254B to diverge from one another more quickly. Thus, a relatively larger wavelength is not advantageous in that the plane where the scale lights 254A and 254B diverge from one another far enough that the interference zone 256' becomes too small, or vanishes, is located relatively closer to the scale grating 80', necessitating a relatively smaller operating gap—with its previously outlined disadvantages. Thus, in accordance with the conditions of Eq. 3, for a given grating pitch $P_g$, in order to provide a larger operating gap, it is desirable to reduce the first wavelength $\lambda$. Conventionally, interferometric encoders have used a first wavelength $\lambda_1$ which is on the order of 780 nm. To reduce the grating pitch while maintaining a similar operating gap, or provide a larger operating gap using the same grating pitch, it is necessary that the light source 280S emits source light 250 with a smaller wavelength $\lambda_1$. For example, in the embodiment shown in FIG. 2, the detector assembly 270 allows the use of a light source 280S having a first wavelength $\lambda_1$ of approximately 400 nm, while maintaining a good signal-to-noise ratio. If a similar first order diffraction angle $\theta$ is maintained (which provides a similar operating gap distance), this allows using a grating pitch Pg which is approximately one half that used with a wavelength of 780 nm. Thus, if a detector assembly 270 is used which includes spatial phase detectors such as those disclosed herein, such a configuration may improve the achievable measurement resolution by approximately a factor of two, based on the allowable reduce grating pitch. Alternatively, if the grating pitch $P_g$ is maintained, then for a first wavelength $\lambda_1$ of approximately 400 nm, the diffraction angle will decrease and the operating gap may be increased. For example, for a grating pitch of 15 microns, the operating gap may be approximately doubled for a given illumination spot 253 and detector assembly 270.

As outlined previously, a first wavelength $\lambda_1$ of approximately 400 nm would produce a low signal in conventionally used photo detectors (e.g., CMOS photodetectors), which typically have a peak wavelength response at approximately 780 nm, and a response at 400 nm which may be on the order of half of their peak wavelength response. Thus prior art interferometric encoders have avoided such wavelengths, or have been adversely affected by the resulting poor signal. However, because the detector assembly 270 uses the spatial phase detectors disclosed herein, wherein the phosphor layer 275 comprises a type of phosphor particles chosen such it produces light at a second wavelength that approximately matches the peak wavelength response of the photodetector elements of the photodetector 273, the resulting signals may exhibit a high signal-to-noise ratio, despite using a first wavelength $\lambda_1$ which would produce a low signal in the photodetector elements of a conventional spatial phase detector. This allows a high level of position signal interpolation and high resolution position measurements, as previously indicated. Thus, the detector assembly 270 includes spatial phase detectors disclosed herein, such that using a first wavelength $\lambda_1$ of very roughly 400 nm does not have an adverse effect on performance, due to principles outlined above. In other words, the embodiment disclosed above allows for an optical encoder with a relatively large operating gap even when the grating pitch $P_g$ is relatively fine, and also provides a high signal-to-noise ratio that allows accurate signal interpolation.

Figure 3:
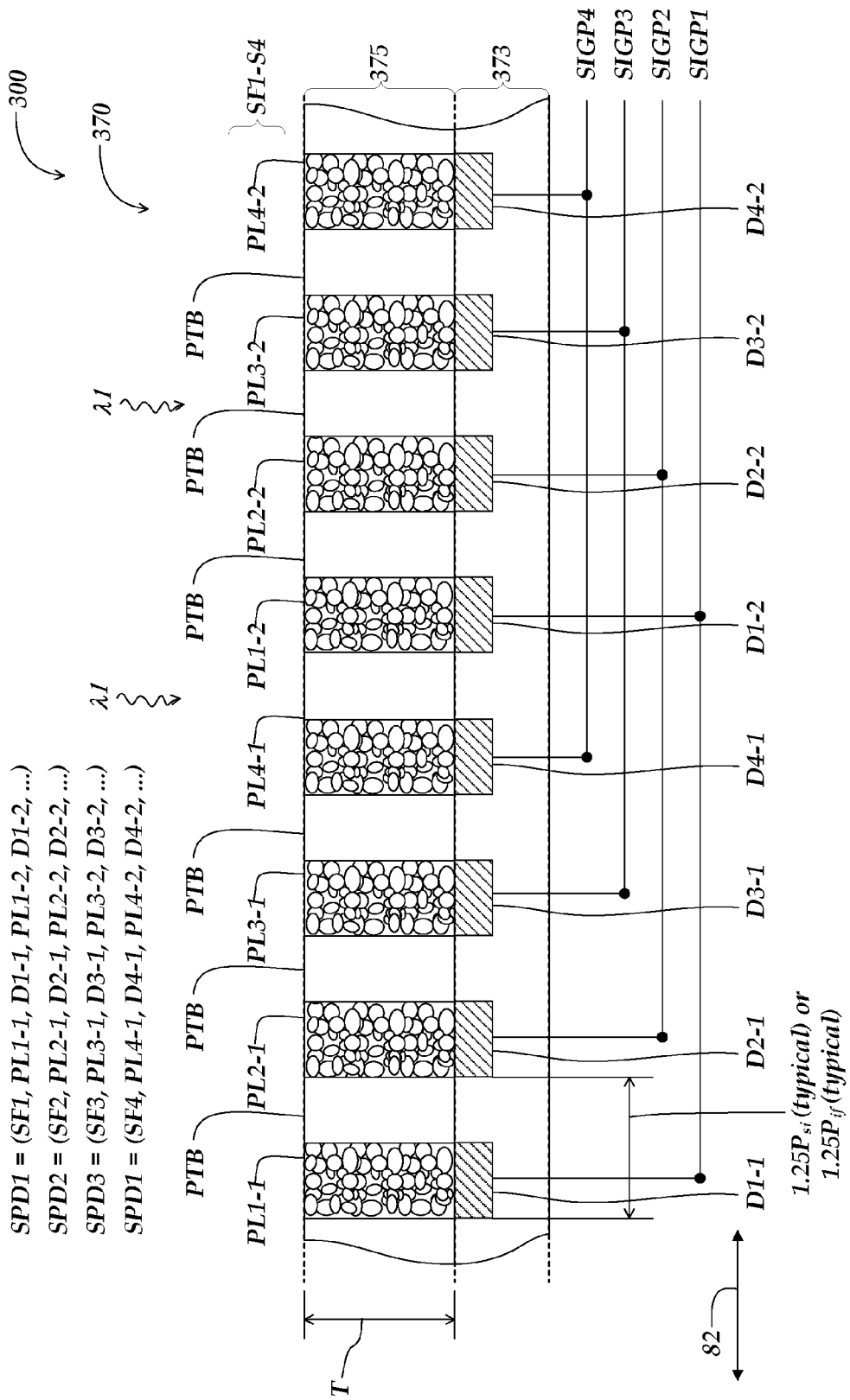
FIG. 3 is a diagram which shows a cross section of a portion of a detector assembly including a third exemplary embodiment of spatial phase detectors according to this invention.

FIG. 3 is a diagram 300 which shows a cross section of a portion of a detector assembly 370 including a third exemplary embodiment of spatial phase detectors SPD1-SPD4 according to this invention. The detector assembly 370 may be used in place of the detector assembly 170 of the self-imaging arrangement 100 or the detector assembly 270 of the interferometric arrangement 200, for example. In the embodiment shown in FIG. 3, the detector assembly 370 comprises a photodetector 373 and a phosphor layer 375. In contrast to the detector assembly 170 which included a continuous phosphor layer 175, in the detector assembly 370 the phosphor layer 375 is patterned, as described below. Furthermore, the spatial phase detectors SPD1-SPD4 are interleaved with one another, rather than forming separate groups.

It will be understood that the spatial phase detectors SPD1-SPD4 shown in FIG. 3 are similar to each other, except for their spatial phase relative to a received periodic intensity pattern (not shown) comprising light at the first wavelength λ1. Therefore, only spatial phase detector SPD1 will be described in detail. As indicated in FIG. 3, the spatial phase detector SPD1 comprises the spatial filter SF1 (described below); the patterned phosphor layer PL1 having portions designated PL1-$i$ (e.g., PL1-1 and PL1-2), which are portions of the phosphor layer 375; and the photodetector element D1 having portions designated D1-$i$ (e.g., D1-1 and D1-2), which are portions of the photodetector 373. It will be appreciated the entire detector assembly 370 includes further repetitions of the pattern of elements shown in FIG. 3 (e.g., corresponding to additional elements PL1-$i$ and D1-$i$ of the spatial phase detector SPD1, and so on for the other spatial phase detectors). In the embodiment shown in FIG. 3, the periodic spatial filter SF1 is provided by the periodic arrangement of the individual portions designated PL1-$i$. That is, in this embodiment, the periodic spatial filter SF1 is not a separate element from the patterned phosphor layer PL1. As shown in FIG. 3, the individual detector elements D1-$i$ may be arranged in an array and interconnected to sum their signals. In some embodiments the individual detector elements D1-$i$ are spaced along the measuring axis 82 at a pitch or spatial wavelength equal to 5 times (or more generally an integer N times) the self-image pitch $P_{si}$ (or the interference fringe pitch $P_{if}$), and have a width that is less than (e.g., half of) $P_{si}$ (or $P_{if}$), such that they spatially filter a moving periodic intensity pattern having a pitch $P_{si}$ (or $P_{if}$). In the embodiment shown in FIG. 3, the patterned portions PL1-1, PL1-2, and so on, of the phosphor layer PL1 are positioned to receive light arising from a periodic intensity pattern at the first wavelength, spatially filter that periodic intensity pattern based on their periodic spatially filtering arrangement SF1, and output second wavelength light including light at a second wavelength that is larger than the first wavelength (e.g., at a second wavelength approximately corresponding to a wavelength response peak of the portions D1-1, D1-2, and so on, of the photodetector element D1). In contrast to the spatial phase detector SPD1 of FIG. 1, because the phosphor layer of the spatial phase detector SPD1 of FIG. 3 is patterned to perform spatial filtering, the second wavelength light received by the photodetector 373 corresponds to the periodic intensity pattern at the first wavelength after it has been spatially filtered by the patterned phosphor layer. The photodetector element D1 (comprising the portions D1-$i$) will then provide a signal indicative of the spatial phase of the periodic intensity pattern at the first wavelength relative to the spatial phase detector SPD1. Because the second wavelength approximately matches the peak wavelength response of the photodetector elements D1-$i$, the resulting signal may exhibit a high signal-to-noise ratio, which allows a high level of position signal interpolation according to known techniques. As shown in FIG. 3, the patterned portions PL1-1, PL2-1, PL3-1, and so on, are separated by barrier portions PTB of a phosphor pattern template. In various embodiments, the phosphor pattern template may comprise a material layer that is fixed to the photodetector 373 (e.g., a deposited or baked on photoresist or plastic layer, or the like), which is then patterned with openings corresponding to the individual detector elements D1-$i$, D2-$i$, etc., by photolithography or nano-imprinting, and/or etching, or other known methods. Then the openings may be filled with the material of the phosphor layer 375 to form the portions PL1-$i$, PL2-$i$, and so on. The material forming the barrier portions PTB is selected to significantly attenuate or block the second wavelength light (and preferably the first wavelength light), to prevent unwanted stray light effects.

Thus, the detector assembly 370 disclosed above includes spatial phase detectors such that using a first wavelength $\lambda_1$ of very roughly 400 nm, which would produce a low signal in the photodetectors of a conventional spatial phase detector (e.g., CMOS photodetectors), does not have an adverse effect on performance due to the principles outlined above. It will be appreciated that the spatial phase detectors SPD2, SPD3, and SPD4 may be identical to the spatial phase detector SPD1, except that they may be arranged at spatial phase positions of 90, 180, and 270 degrees of spatial phase shift, respectively, with respect to the position of the spatial phase detector SPD1 and the periodic intensity pattern at the first wavelength. Such an arrangement provides respective signals from the respective spatial phase detectors which may be processed to provide position signals based on high resolution interpolated quadrature signals, according to known quadrature signal processing methods.

In various embodiments, the phosphor layer(s) disclosed herein may comprise one or more conventional phosphor materials such as YAG-Ce$^+$-based phosphors such as disclosed in U.S. Pat. Nos. 6,066,861 and 6,417,019. In some embodiments, a phosphor layer may comprise photoluminescent semiconductor nanoparticles or Q-particle phosphors (commonly called quantum dots or semiconductor quantum dots) such as disclosed in U.S. Patent Application Publication No. 2008/0173886, or nanocrystalline materials such as disclosed in U.S. Pat. No. 7,235,792, or semiconductor nanocrystals such as disclosed in U.S. Pat. No. 7,083,490, or the like. Each of these patents and publications are hereby incorporated herein by reference in their entirety.

In general, in order to detect a relatively fine pitch or spatial period in the detected periodic intensity pattern, without adding unwanted signal influences due to non-uniform phosphor particle distribution and/or size, relatively smaller particles may be advantageous. A smaller particle size is desirable in order to provide a more uniform phosphor density and more uniform energy conversion or signal response within a small fringe pitch and/or detector element width (e.g., a width on the order of 20 microns or less, in some embodiments). In other words, smaller particles are preferred in that the resulting phosphor layer may provide second-wavelength light that more closely corresponds to the periodic intensity pattern at the first wavelength, which provides the detected grating displacement information. In various embodiments, it may be desirable the phosphor particles have a density corresponding to at least 80% by volume of the phosphor layer, and/or that the phosphor particles have a size distribution such that the average particle dimension (e.g., the dimension representing the nominal diameter, or maximum dimension of a particle) is at most 25% of the period or pitch of the period intensity pattern at the first wavelength, and/or that the thickness T of the phosphor layer be large enough that all light that reaches the photodetector is second wavelength light (e.g., T is at least 3 times the average phosphor particle dimension, in some embodiments). The particles may be embedded in, or covered with, a transparent binder, to fix them in position.

Figure 4:
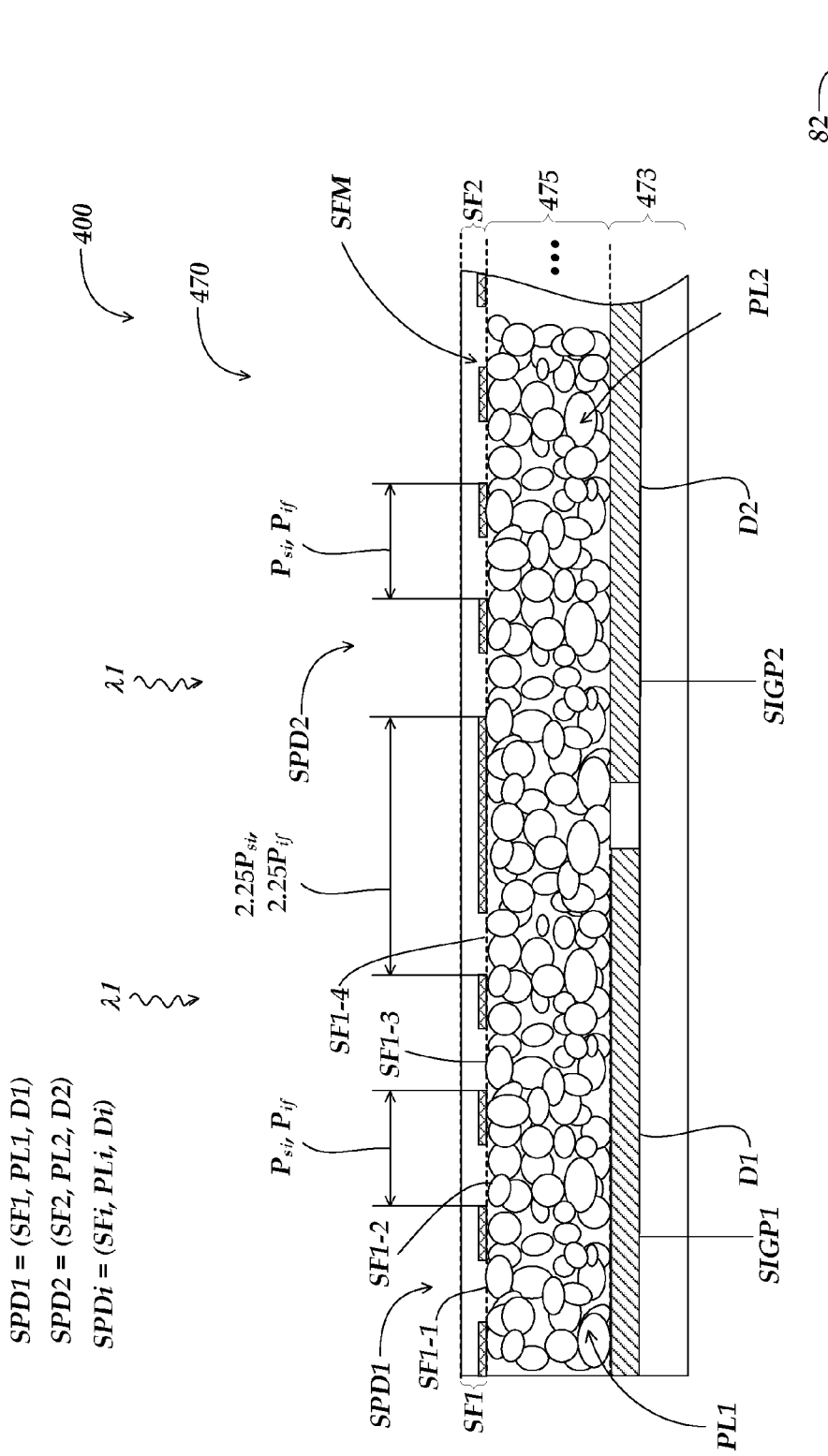
FIG. 4 is a diagram which shows a cross section of a portion of a detector assembly including a fourth exemplary embodiment of spatial phase detectors according to this invention.

FIG. 4 is a diagram 400 which shows a cross section of a portion of a detector assembly 470 including a fourth exemplary embodiment of spatial phase detectors (e.g., the illustrated spatial phase detectors SPD1 and SPD2) according to this invention. The detector assembly 470 may be used in place of previously disclosed detector assemblies, for example. In the embodiment shown in FIG. 4, the detector assembly 470 comprises a photodetector 473 and a phosphor layer 475. In contrast to the detector assembly 370 which included spatial filters provided by a patterned phosphor layer 375, in the detector assembly 470 the spatial filters are provided by a separate spatial filter mask SFM, described below. Furthermore, the phosphor layer 475 may be continuous (not patterned) and the spatial phase detectors may form separate groups.

It will be understood that the spatial phase detectors SPD1 and SPD2 shown in FIG. 4 (and more generally, additional spatial phase detectors SPDi, each with spatial filter SFi, phosphor layer PLi, and detector element Di) are similar to each other, except for their spatial phase relative to a received periodic intensity pattern (not shown) comprising light at the first wavelength λ1. Therefore, only spatial phase detector SPD1 will be described in detail.

As indicated in FIG. 4, the spatial phase detector SPD1 comprises the spatial filter SF1 (described below); the phosphor layer PL1, which is a portion of the phosphor layer 475; and the photodetector element D1, which is a portion of the photodetector 473. It will be appreciated the entire detector assembly 470 includes further repetitions of the pattern of elements shown in FIG. 4 (e.g., corresponding to additional elements PL3 and D3 of the spatial phase detector SPD3, and so on for the spatial phase detector SPD4). In the embodiment shown in FIG. 4, the periodic spatial filter SF1 is provided by the individual open portions designated SF1-$i$ (e.g., SF1-1, SF1-2, etc.) of the spatial filter mask element SFM. That is, in this embodiment, the periodic spatial filter SF1 is a separate element from the phosphor layer PL1 and the detector element D1. In some embodiments the individual spatial filter elements SF1-$i$ are spaced along the measuring axis 82 at a pitch or spatial wavelength equal to the self-image pitch $P_{si}$ (or the interference fringe pitch $P_{if}$), and have a width that is less than (e.g., half of) $P_{si}$ (or $P_{if}$), such that they spatially filter a moving periodic intensity pattern having a pitch $P_{si}$ (or $P_{if}$).

In the embodiment shown in FIG. 4, the spatial filter elements SF1-$i$ are positioned to receive light arising from a periodic intensity pattern at the first wavelength, spatially filter that periodic intensity pattern based on their periodic spatially filtering arrangement SF1, and output spatially filtered first wavelength light. That spatially filtered first wavelength light is received by the phosphor layer PL1, which is a portion of the phosphor layer 475. The phosphor layer PL1 outputs energy corresponding to the amount of spatially filtered first wavelength light it receives at a second wavelength that is larger than the first wavelength (e.g., at a second wavelength approximately corresponding to a wavelength response peak of the photodetector element D1). In contrast to the spatial phase detector SPD1 of FIG. 1, because the spatial filter mask element SFM is patterned to perform spatial filtering, the second wavelength light received by the photodetector 373 corresponds to the periodic intensity pattern at the first wavelength after it has been spatially filtered by the spatial filter mask element SFM. The photodetector element D1, will then provide a signal indicative of the spatial phase of the periodic intensity pattern at the first wavelength relative to the spatial phase detector SPD1. As outlined above, the second wavelength approximately matches the peak wavelength response of the photodetector elements D1, and the resulting signal may exhibit a high signal-to-noise ratio, which allows a high level of position signal interpolation according to known techniques.

It will be appreciated that the spatial phase detector SPD2 (and SPD3 and SPD4, not shown) may be identical to the spatial phase detector SPD1, except that they may be arranged at spatial phase positions of 90, 180, and 270 degrees of spatial phase shift respectively, with respect to the position of the spatial phase detector SPD1 and the periodic intensity pattern at the first wavelength. Such an arrangement provides respective signals from the respective spatial phase detectors which may be processed to provide position signals based on high resolution interpolated quadrature signals, according to known quadrature signal processing methods.

While various exemplary embodiments have been illustrated and described, numerous variations in the illustrated and described arrangements of features and sequences of operations will be apparent to one skilled in the art based on this disclosure. As one example, detector assemblies having four spatial phase detectors have been illustrated. However, the teachings disclosed herein may be implemented in known layouts that use three spatial phases. Thus, it will be appreciated that various changes according to the teachings herein can be made to the various particular embodiments outlined above without departing from the spirit and scope of the invention.

The invention claimed is:

1. A device for measuring the relative displacement between two members, the device comprising:
   a scale comprising a scale grating formed along a measuring axis direction; and
   an optical encoder readhead comprising:
      a light source configured to output source light with a first wavelength to the scale grating which outputs scale light to form a periodic intensity pattern at the first wavelength which moves with the scale; and
      a detector assembly operable to detect the position of the periodic intensity pattern at the first wavelength relative to the detector assembly,
   wherein:
      the first wavelength is at least 300 nm and at most 450 nm; and
      the detector assembly comprises a plurality of spatial phase detectors comprising:
         a periodic spatial filter;
         a phosphor layer positioned to receive light arising from the periodic intensity pattern at the first wavelength and output second wavelength light including a second wavelength that is larger than the first wavelength; and
         a photodetector element positioned to input the second wavelength light and output a signal indicative of the spatial phase of the periodic intensity pattern at the first wavelength relative to that spatial phase detector, and
   wherein:
      the photodetector element inputs second wavelength light corresponding to a spatially filtered version of the first wavelength periodic intensity pattern; and
      the periodic spatial filter comprises at least one of (a) a pattern of individual portions of the photodetector element which provides the periodic spatial filter, and (b) a pattern of individual portions of the phosphor layer which provides the periodic spatial filter.

2. The device of claim 1, wherein the periodic spatial filter comprises the pattern of individual portions of the photodetector element.

3. The device of claim 2, wherein the phosphor layer is a continuous layer located proximate to the pattern of individual portions.

4. The device of claim 1, wherein the periodic spatial filter comprises the pattern of individual portions of the phosphor layer.

5. The device of claim 4, wherein the photodetector element is a continuous element located proximate to the pattern of individual portions.

6. The device of claim 1, wherein the periodic intensity pattern at the first wavelength comprises one of (a) a self image of the scale grating, and (b) interference fringes arising from interfering diffraction orders of scale light diffracted by the scale grating.

7. The device of claim 6, wherein the scale grating has a scale pitch Pg which is less than 20 microns.

8. The device of claim 7, wherein the scale grating comprises a scale pitch Pg which is less than 10 microns.

9. The device of claim 1, wherein the second wavelength includes wavelengths that coincide with a wavelength response peak of the photodetector element.

10. The device of claim 1, wherein the second wavelength is between 500 and 800 nm.

11. The device of claim 1, wherein the phosphor layer comprises phosphor particles that are semiconductor nanocrystals.

12. The device of claim 1, wherein the phosphor layer comprises phosphor particles that have a density corresponding to at least 80% by volume of the phosphor layer.

13. The device of claim 1, wherein a thickness of the phosphor layer is configured to cause the light reaching the photodetector element to be second wavelength light.

14. The device of claim 1, wherein the phosphor layer comprises phosphor particles which have a size distribution such that the average particle dimension is at most 25% of the period of the periodic intensity pattern at the first wavelength.

15. The device of claim 1, wherein the photodetector element comprises a CMOS photodetector array.

16. A device for measuring the relative displacement between two members, the device comprising:
   a scale comprising a scale grating formed along a measuring axis direction; and
   an optical encoder readhead comprising:
      a light source configured to output source light with a first wavelength to the scale grating which outputs scale light to form a periodic intensity pattern at the first wavelength which moves with the scale; and
      a detector assembly operable to detect the position of the periodic intensity pattern at the first wavelength relative to the detector assembly,
   wherein:
      the first wavelength is at least 300 nm and at most 450 nm; and
      the detector assembly comprises a plurality of spatial phase detectors comprising:
         a periodic spatial filter;
         a phosphor layer positioned to receive light arising from the periodic intensity pattern at the first wavelength and output second wavelength light including a second wavelength that is larger than the first wavelength; and
         a photodetector element positioned to input the second wavelength light and output a signal indicative of the spatial phase of the periodic intensity pattern at the first wavelength relative to that spatial phase detector, and
   wherein the second wavelength includes wavelengths that coincide with a wavelength response peak of the photodetector element.

17. A device for measuring the relative displacement between two members, the device comprising:
   a scale comprising a scale grating formed along a measuring axis direction; and
   an optical encoder readhead comprising:
      a light source configured to output source light with a first wavelength to the scale grating which outputs scale light to form a periodic intensity pattern at the first wavelength which moves with the scale; and
      a detector assembly operable to detect the position of the periodic intensity pattern at the first wavelength relative to the detector assembly,
   wherein:
      the first wavelength is at least 300 nm and at most 450 nm; and
      the detector assembly comprises a plurality of spatial phase detectors comprising:
         a periodic spatial filter;
         a phosphor layer positioned to receive light arising from the periodic intensity pattern at the first wavelength and output second wavelength light including a second wavelength that is larger than the first wavelength; and
         a photodetector element positioned to input the second wavelength light and output a signal indicative of the spatial phase of the periodic intensity pattern at the first wavelength relative to that spatial phase detector, and
   wherein the phosphor layer comprises phosphor particles that have a density corresponding to at least 80% by volume of the phosphor layer.

* * * * *